United States Patent
Ohara et al.

(10) Patent No.: US 7,151,897 B2
(45) Date of Patent: Dec. 19, 2006

(54) OPTICAL CLOCK PHASE-LOCKED LOOP CIRCUIT

(75) Inventors: Takuya Ohara, Yokohama (JP);
Hidehiko Takara, Yokosuka (JP);
Satoki Kawanishi, Yokohama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 638 days.

(21) Appl. No.: 10/310,086

(22) Filed: Dec. 4, 2002

(65) Prior Publication Data
US 2003/0118349 A1 Jun. 26, 2003

(30) Foreign Application Priority Data
Dec. 4, 2001 (JP) ............... 2001-370169

(51) Int. Cl.
H04B 10/00 (2006.01)
H04B 10/08 (2006.01)
H04B 17/00 (2006.01)

(52) U.S. Cl. ............... 398/155; 398/163; 398/32; 398/33

(58) Field of Classification Search ............... 398/155, 398/163, 32, 33
See application file for complete search history.

(56) References Cited

U.S. PATENT DOCUMENTS 5,504,610 A * 4/1996 Bulow ............... 398/154
5,706,113 A * 1/1998 Kawanishi et al. ......... 398/212

FOREIGN PATENT DOCUMENTS

| EP | 0 595 206 A2 | 5/1994 |
| EP | 1 119 119 A1 | 7/2001 |
| JP | 06-138500 | 5/1994 |
| JP | 7-287263 | 10/1995 |
| JP | 7-287264 | 10/1995 |
| JP | 08-163026 | 6/1996 |
| JP | 2001-242501 | 9/2001 |

OTHER PUBLICATIONS

"100 Gbit/s, 50 km, and Nonrepeated Optical Transmission Employing All-Optical Multi/Demultiplexing and PLL Timing Extraction", S. Kawanishi, H. Takara, K. Uchiyama, T. Kitoh and M. Saruwatari, Electronics Letters, vol. 29, No. 12, Jun. 10, 1993, pp. 1075-1077.

(Continued)

Primary Examiner—Jason Chan
Assistant Examiner—Nathan Curs
(74) Attorney, Agent, or Firm—Harness, Dickey & Pierce, P.L.L.C.

(57) ABSTRACT

This optical clock phase-locked loop circuit includes an oscillator 12, an optical coupler 2, an optical cross-correlation detection device 3 that outputs light containing the correlating components of two lights from the coupled light of optical coupler 2, an optical band pass filter 4 that extracts light of a wavelength that contains cross-correlating components, an optical receiver 5, a phase comparator 6 that compares the phases of the output signal of the oscillator 12 and the cross-correlation signal from the optical receiver 5, a voltage controlled oscillator 7 that changes the oscillation frequency and phase corresponding to the output of the phase comparator 6, an optical pulse generator 8 that generates a optical clock pulse containing an nth harmonic component, an optical coupler 10 that divides optical clock, and an optical modulator 11 driven by low-frequency oscillator 12 that modulates optical clock from optical coupler 10.

12 Claims, 12 Drawing Sheets

OTHER PUBLICATIONS

"10 GHz Timing Extraction From Randomly Modulated Optical Pulses Using Phase-Locked Loop WIth Travelling-Wave Laser-Diode Optical Amplifier Using Optical Gain Modulation", S. Kawanishi and M. Saruwatari, Electronics Letters, vol. 28, No. 5, Feb. 27, 1992, pp. 510-511.

"100 Gbit/s Optical Signal Eye-Diagram Measurement With Optical Sampling Using Organic Nonlinear Optical Crystal", H. Takara, S. Kawanishi, A. Yokoo, S. Tomaru, T. Kitoh and M. Saruwatari, Electronics Letters, vol. 32, No. 24, Nov. 21, 1996, pp. 2256-2258.

"Ultrahigh-Speed Clock Recovery with Phase Lock Loop Based on Four-Wave Mixing in a Traveling-Wave Laser Diode Amplifier", Osamu Kamatani and Satoki Kawanishi, Journal of Lightwave Technology, vol. 14, No. 8, Aug. 1996, pp. 1757-1767.

"Ultra-High-Speed PLL-Type Clock Recovery Circuit Based on All-Optical Gain Modulation in Traveling-Wave Laser Diode Amplifier", Satoki Kawanishi and Masatoshi Saruwatari, Journal of Lightwave Technology, vol. 11,No. 12, Dec. 1993, pp. 2123-2129.

"Ultra High-Speed Optical Waveform Measurement Method Using Optical Sampling with Sum-Frequency Generation", Hidehiko Takara, Satoki Kawanishi, Yoshiaki Yamabayashi and Masatoshi Saruwatari, Electronic Information and Communication Institute, Article B-I, vol. J 75-B-I, No. 5, pp. 372-380, May 1992.

Uchiyama, K. et al.; "Highly precise bit-phase synchronization technique for an optically controlled time-division demultiplexer"; Optical Fiber Communication Conference (OFC); Technical Digest Postconference Edition; Baltimore, MD; Mar. 7-10, 2000; New York, NY; IEEE; U.S. vol. 3 of 4; Mar. 7, 2000; pp. THV3-1-THV3-3; XP001036045; ISBN: 0-7803-5952-6.

European Search Report for Application No. 02292976 mailed Sep. 10, 2003.

"1.5µm-Band Wavelength Conversion Based on Cascaded Second-Order Nonlinearity in $LiNbO_3$ Waveguides", Chou et al., IEEE Photonics Technology Letters, vol. 11, No. 6 (1999) p. 653-655.

Japanese Office Action dated Mar. 22, 2006 issued on Japanese Application No. 2001-370169.

* cited by examiner

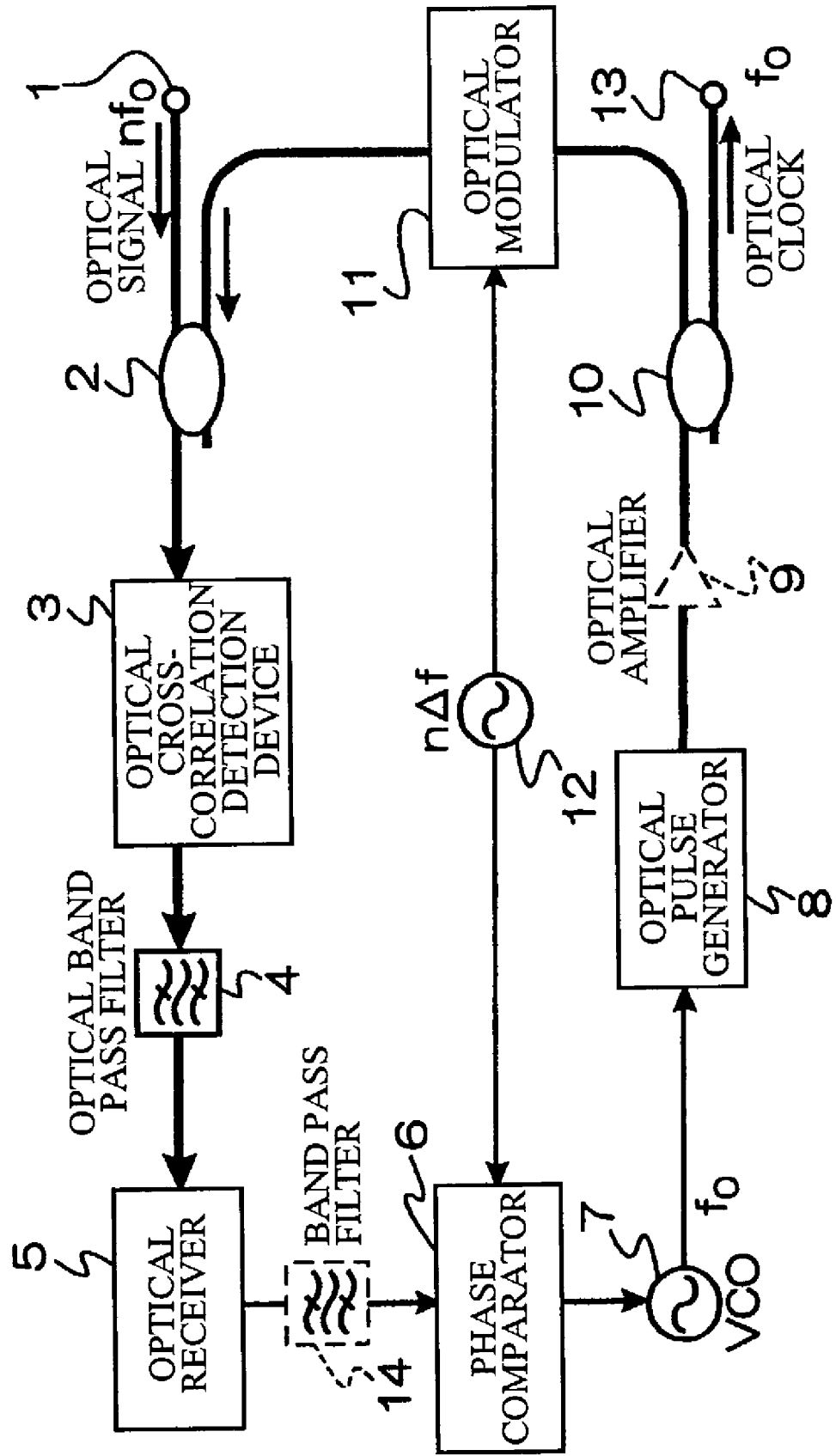

(i) CASE OF SEPARATION OF OPTICAL SIGNAL WAVELENGTH $\lambda_{sig}$ AND OPTICAL CLOCK WAVELENGTH $\lambda_{clk}$ $$\frac{1}{\lambda_{FWM}} = \frac{2}{\lambda_{sig}} - \frac{1}{\lambda_{clk}}$$

(ii) CASE OF OPTICAL SIGNAL WAVELENGTH $\lambda_{sig}$ AND OPTICAL CLOCK WAVELENGTH $\lambda_{clk}$ BEING IN CLOSE PROXIMITY TO THE DEGREE OF COHERENT INTERFERENCE $$\frac{1}{\lambda_{FWM}} = \frac{2}{\lambda_{sig}} - \frac{1}{\lambda_{clk}}$$

$$\frac{1}{\lambda_{SFG}} = \frac{1}{\lambda_{sig}} + \frac{1}{\lambda_{clk}}$$

5-TIMES MULTIPLEXING

4-TIMES MULTIPLEXING

OPTICAL CLOCK PHASE-LOCKED LOOP CIRCUIT

BACKGROUND OF THE INVENTION

1. Field of the Invention

The present invention relates to an optical clock phase-locked loop circuit that is preferably used during recovery of an optical clock and so forth in an optical transmission system.

2. Background Art

The majority of current optical communication systems employ digital transmission systems. For digital transmission systems, attenuation and waveform distortion of optical signal received from the transmission line is regenerated by arranging regenerators at fixed intervals along the transmission line. As a result, noise and distortion applied to the signal is limited within a single span, thereby making it possible to prevent deterioration of the signal-to-noise ratio caused by accumulation of noise and waveform distortion, and enabling high-quality signals to be sent over long distances.

In order to realize such digital transmission systems, a timing extraction function becomes important that determines the accurate time position of the optical signal. In a transmission system, since timing fluctuations of the optical signal occur due to temperature changes in the transmission line and other changes in the external environment, it is necessary to extract the timing from the optical signal after transmission.

An example of this type of timing extraction technology is shown in FIG. 13 which indicates an example of a optical clock phase-locked loop circuit (optical PLL circuit) of the prior art. In this drawing, reference symbol 1 indicates an optical signal input terminal, 2 an optical coupler, 3 an optical cross-correlation detection device, 4 an optical band pass filter, 5 an optical receiver, 6 a phase comparator, 7 a voltage controlled oscillator (VCO), 20 a microwave mixer, 21 and 24 optical pulse generators, 22 a low-frequency oscillator, 13 an optical clock output terminal, 23 a frequency doubler, and 25 an optical amplifier.

The following provides an explanation of the operation of the optical clock phase-locked loop circuit of the prior art shown in FIG. 13. The frequency of the output signal of VCO 7 is shifted by low-frequency oscillator 22 and microwave mixer 20, and drives optical pulse generator 21 to generate optical clock having a repetition frequency of $f_0+\Delta f$. The waveform of the optical clock is not required to be a sine wave, but rather is required to have a narrow pulse width and contain a harmonic component $n(f_0+\Delta f)$ (provided n is an integer of 2 or more) of a repetition frequency in its spectrum. The $n\Delta f$ component is generated by detecting the cross-correlation signal between this nth harmonic $n(f_0+\Delta f)$ and optical signal of a bit rate $nf_0$. A phase comparison is then performed between this $n\Delta f$ output and $n\Delta f$ signal for which the output of low-frequency oscillator 22 has been multiplexed n times, and PLL operation is achieved by feeding this back to VCO 7.

The details of this principle are described in Japanese Unexamined Patent Application, First Publication No. 7-287264 entitled, "Optical Cross-Correlation Detection Circuit and Optical Clock Phase-Locked Loop Circuit".

However, the repetition frequency of the optical clock output from optical pulse generator 21 in the optical PLL circuit is $f_0+\Delta f$, and is not synchronized with bit rate $nf_0$ of the optical signal. Consequently, in order to obtain optical clock that has been synchronized with the optical signal, a different optical pulse generator 24 must be driven by the output of VCO 7 (repetition frequency $f_0$), and amplified by optical amplifier 25 as necessary. In this case, there is the problem of deterioration of the stability of the optical clock that is output due to jitter of optical pulse generator 24 and temperature changes and so forth of the optic fiber in optical amplifier 25 composed of an optic fiber amplifier and so forth.

In order to solve the problems, the object of the present invention is to provide an optical clock phase-locked loop circuit capable of realizing stable operation as compared with the prior art.

BRIEF SUMMARY OF THE INVENTION

In order to solve the problems, the optical clock phase-locked loop circuit of a first aspect of the present invention is provided with: a first oscillator that outputs an alternating current signal, a first optical coupler that couples input optical signal and modulated optical clock, an optical cross-correlation detection device that incorporates optical signal and modulated optical clock coupled by the first optical coupler, and outputs light that contains the cross-correlation components between both lights, an optical band pass filter that extracts light of a wavelength that contains cross-correlating components from the output from the optical cross-correlation detection device, an optical receiver that converts a light containing cross-correlating components extracted with the optical band pass filter to an electric signal, a phase comparator that compares the phases of the output signal of the first oscillator and the cross-correlation signal output from the optical receiver, a second oscillator that changes the oscillation frequency and phase corresponding to the output of the phase comparator, an optical pulse generator driven by the second oscillator that generates optical clock having a narrow enough pulse width for containing an nth harmonic component (where n is an integer of 2 or more), a second optical coupler that divides into two portions the optical clock output from the optical pulse generator, an optical modulator driven by the first oscillator that modulates one portion of the optical clock divided by the second optical coupler, and outputs that portion in the form of the modulated optical clock to the first optical coupler, and an output device that outputs the other portion of the optical clock divided by the second optical coupler.

According to this optical clock phase-locked loop circuit, since an optical pulse generator or broad-band pulse generator that generates clock pulse light can be installed within a PLL loop, jitter caused by the optical pulse generator and so forth or frequency fluctuations and so forth caused by temperature changes of the optic fiber can be absorbed within the PLL, thereby making it possible to realize stable operation as compared with the prior art.

The optical cross-correlation detection device may also be a traveling-wave semiconductor optical amplifier. The optical cross-correlation detection device may also be composed of optic fiber. The optical cross-correlation detection device may also be composed of nonlinear optical crystal.

An optical short pulse source that generates optical pulses containing broad-band frequency components may be used instead of the optical pulse generator. In addition, an optical band pass filter may be provided in the output of the second optical coupler.

The optical modulator may also be an optical intensity modulator. In addition, the optical modulator may also be an optical phase modulator.

The optical cross-correlation detection device may also use sum frequency generation in a nonlinear optical crystal. The optical cross-correlation detection device may also use cascaded $\chi^{(2)}$ processes in a nonlinear optical crystal. The optical short pulse source may also be a mode-locked laser or supercontinuum source.

The optical clock phase-locked loop circuit of a second aspect of the present invention is provided with: a first oscillator that outputs an alternating current signal, a first optical coupler that couples input optical signal and modulated optical clock, an optical cross-correlation detection device that incorporates optical signal coupled by the first optical coupler and modulated optical clock, and outputs light that contains the cross-correlation components between both lights, an optical band pass filter that extracts light of a wavelength that contains cross-correlating components from the output from the optical cross-correlation detection device, an optical receiver that photoelectrically converts light containing cross-correlating components extracted with the optical band pass filter, a phase comparator that composes the phases of the output signal of the first oscillator and the cross-correlation signal output from the optical receiver, a second oscillator that changes the oscillation frequency and phase corresponding to the output of the phase comparator, an optical pulse generator driven by the second oscillator that generates an optical pulse train at a repetition frequency n times (where n is an integer of 2 or more) the oscillation frequency of said second oscillator, a second optical coupler that divides into two portions the optical clock output from the optical pulse generator, an optical modulation device driven by the first oscillator that modulates one portion of the optical clock divided by the second optical coupler, and outputs that portion in the form of the modulated optical clock to the first optical coupler, and an output device that outputs the other portion of the optical clock divided by the second optical coupler.

Instead of the optical pulse generator, an optical short pulse source may be used that generates an optical pulse train containing a broad-band frequency component at a repetition frequency n times (where n is an integer of 2 or more) the oscillation frequency of the second oscillator, and an optical band pass filter may be provided in the output of the second optical coupler.

BRIEF DESCRIPTION OF THE SEVERAL VIEWS OF THE DRAWING

FIG. 1 is a block diagram showing one embodiment of the optical clock phase-locked loop circuit according to the present invention.

DETAILED DESCRIPTION OF THE INVENTION

Embodiment 1

Figure 2A:
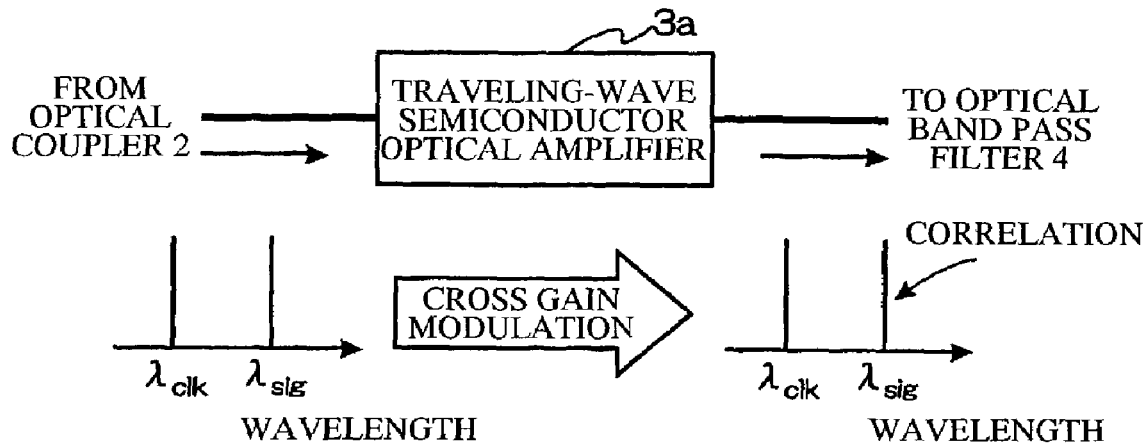
FIGS. 2A and 2B are drawings for explaining the constitution and action of traveling-wave semiconductor optical amplifier 3a as an example of optical cross-correlation detection device 3 of FIG. 1, with FIG. 2A showing (i) the case of optical signal wavelength $\lambda_{sig}$ and optical clock wavelength $\lambda_{clk}$ being separated, and FIG. 2B indicating (ii) the case of optical signal wavelength $\lambda_{sig}$ and optical clock wavelength $\lambda_{clk}$ being in close proximity to the degree of coherent interference.

FIG. 1 is a block diagram showing the constitution of one embodiment of an optical clock phase-locked loop circuit according to the present invention.

In FIG. 1, reference symbol 1 indicates an optical signal input terminal, 2 an optical coupler, 3 an optical cross-correlation detection device, 4 an optical band pass filter, 5 an optical receiver, 6 a phase comparator, 7 a VCO, 8 an optical pulse generator, 9 an optical amplifier, 10 an optical coupler, 11 an optical modulator, 12 a low-frequency oscillator, 13 an optical clock output terminal, and 14 a band pass filter. Oscillation frequency $f_0$ of VCO 7, which changes oscillation frequency and phase corresponding to the output voltage of phase comparator 6, is set so that the bit rate of optical signal input from optical signal input terminal 1 is $nf_0$ (where n is an integer of 2 or more) ($s^{-1}$).

In the constitution, optical signal input from optical signal input terminal 1 is input to one of the input terminals of 2 input×2 output divided optical coupler 2, output light of optical modulator 11 is input to the other input terminal, and they are coupled in optical coupler 2. Output light from one of the output terminals of optical coupler 2 is input to optical cross-correlation detection device 3, and output light of optical cross-correlation detection device 3 is input to optical band pass filter 4. Output light of optical band pass filter 4 is input to optical receiver 5, and an output electrical signal converted to an electrical signal by optical receiver 5 is input to band pass filter 14. The output signal of band pass filter 14 is input to one of the input terminals of phase comparator 6, and an oscillation signal of $n\Delta f$ Hz of low-frequency oscillator 12 is input to the other input terminal of phase comparator 6.

In addition, the output signal of phase comparator 6 is input to VCO 7, and the oscillation output signal of VCO 7 is input to optical pulse generator 8. The optical pulse output of pulse generator 8 is input to optical amplifier 9, and the output of optical amplifier 9 is input to one of the input terminals of 2 input×2 output divided optical coupler 10. Output light from one of the output terminals of optical coupler 10 is input to optical modulator 11, and output light from the other output terminal is output from optical clock output terminal 13. Optical modulator 11 modulates the input light at the output signal of nΔf Hz of low-frequency oscillator 12, and inputs the modulated optical signal to optical coupler 2.

The following provides an explanation of the operation of the present embodiment. Optical pulse generator 8 is driven by the output signal of VCO 7, and generates optical clock of repetition frequency $f_0$. Similar to the prior art, it is necessary that the waveform of the optical clock contain a harmonic component having a narrow pulse width and not a sine wave. This optical clock is divided into two portions by optical coupler 10 after being amplified with optical amplifier 9 as necessary. One of the outputs of optical coupler 10 is output from optical clock output terminal 13. The other output is made to have a frequency component in which the nth harmonic component $nf_0$ of the optical clock is $nf_0 \pm n\Delta f$ (n is a non-negative integer) by modulating at frequency nΔf using optical modulator 11. The cross-correlation between this $n(f_0 \pm \Delta f)$ component and bit rate $nf_0$ is detected using optical cross-correlation detection device 3 to generate the nΔf component.

Light of a wavelength that contains cross-correlating components is extracted from the output of the optical cross-correlation detection device 3 with optical band pass filter 4. Subsequently, similar to the prior art, the light is converted to an electrical signal with optical receiver 5, and the nΔf component contained therein is compared with a reference signal output from low-frequency oscillator 12 by phase comparator 6, and the output is fed back to VCO 7, thereby realizing the operation of a PLL. If necessary, band pass filter 14 that uses nΔf as a passing center frequency may be used for the output of optical receiver 5. Namely, the-mentioned optical amplifier 9 and band pass filter 14 can be omitted from the constitution of FIG. 1.

According to the constitution, since repetition frequency $f_0$ of the output of optical pulse generator 8 is synchronized to repetition frequency $nf_0$ of the optical signal, optical clock can be output that has greater stability than that of the prior art. In contrast to the prior art creating the $n(f_0 \pm \Delta f)$ component in an electrical stage using a microwave mixer, in the present invention, this is achieved by carrying out in an optical stage using optical modulator 11.

Embodiment 2

Figure 2B:
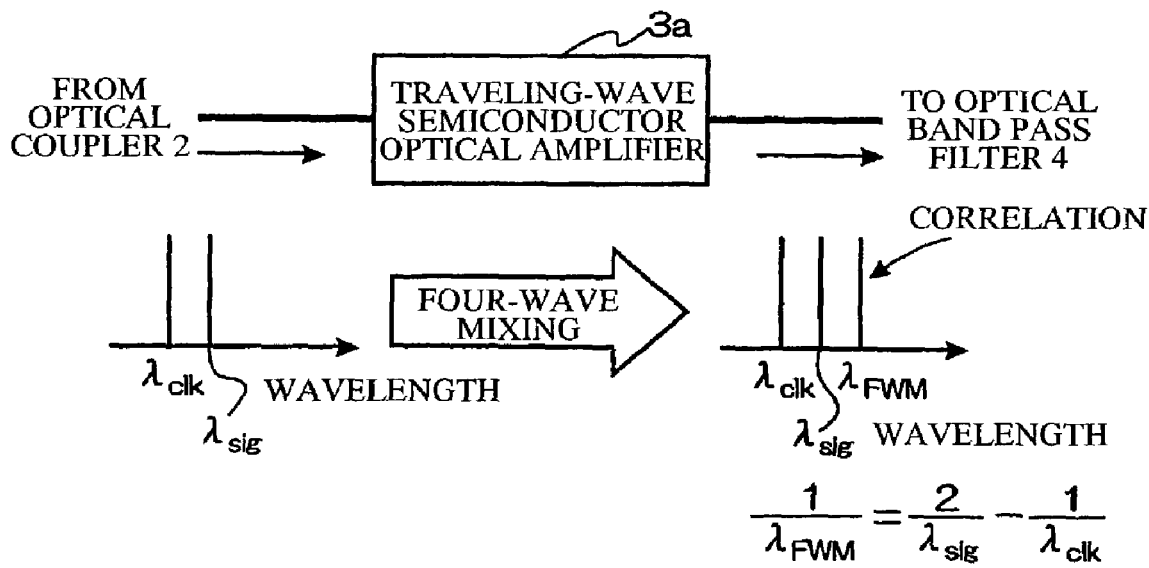

FIGS. 2A and 2B are block diagrams showing an example of an optical cross-correlation detection device 3 in the optical clock phase-locked loop circuit shown in FIG. 1.

FIGS. 2A and 2B show the frequency distribution characteristics (relationship between wavelength and intensity distribution) of input and output light under different operating conditions of (i) and (ii) in the case of composing optical cross-correlation detection device 3 of FIG. 1 using a traveling-wave semiconductor optical amplifier 3a.

FIG. 2A shows the case in which (i) optical signal wavelength $\lambda_{sig}$ and optical clock wavelength $\lambda_{clk}$ are apart (separated to a degree in which there is no coherent interference). In this case, cross-correlation between the light is detected due to the gain of the optical signal being modulated by optical clock in traveling-wave semiconductor optical amplifier 3a. In this case, optical band pass filter 4 of FIG. 1 is set so as to extract only optical signal.

Details of the operating principle and experimental results of a traveling-wave semiconductor optical amplifier are described in S. Kawanishi et al., "10 GHz timing extraction from randomly modulated optical pulses using phase-locked loop with traveling-wave laser diode optical amplifier using optical gain modulation," Electron. Lett., vol. 28, pp. 510–511, 1992.

On the other hand, FIG. 2B shows the case in which (ii) optical signal wavelength $\lambda_{sig}$ and optical clock wavelength $\lambda_{clk}$ are in close proximity to the degree in which there is coherent interference. In this case, a component corresponding to cross-correlation between the two is generated at a new wavelength $\lambda_{FWM}$ as a result of four-wave mixing that occurs due to phase matching of the optical signal and optical clock with traveling-wave semiconductor optical amplifier 3a. $1/\lambda_{FWM} = 2/\lambda_{sig} - 1/\lambda_{clk}$. In this case, optical band pass filter 4 is set so as to only extract four-wave mixing light $\lambda_{FWM}$.

Embodiment 3

Figure 3:
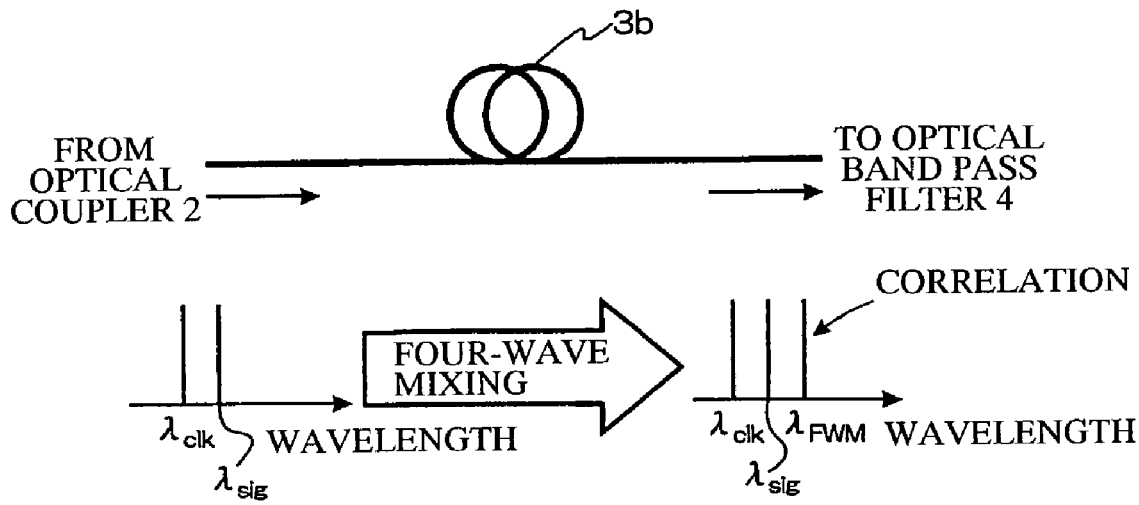
FIG. 3 is a drawing for explaining the constitution and action of optic fiber 3b as another example of optical cross-correlation detection device 3 of FIG. 1.

FIG. 3 is a block diagram showing another example of optical cross-correlation detection device 3 in the optical clock phase-locked loop circuit shown in FIG. 1.

FIG. 3 shows a constitution that is used for the optical cross-correlation detection device 3 of FIG. 1 in which optic fiber 3b is used as a medium that generates four-wave mixing. In the case of the present embodiment, phase matching conditions can be satisfied by setting the wavelengths of the optical signal and optical clock to within ±10 nm of the zero-dispersion wavelength of optic fiber 3b, thereby enabling a PLL to be realized by this constitution as well.

Embodiment 4

Figure 4:
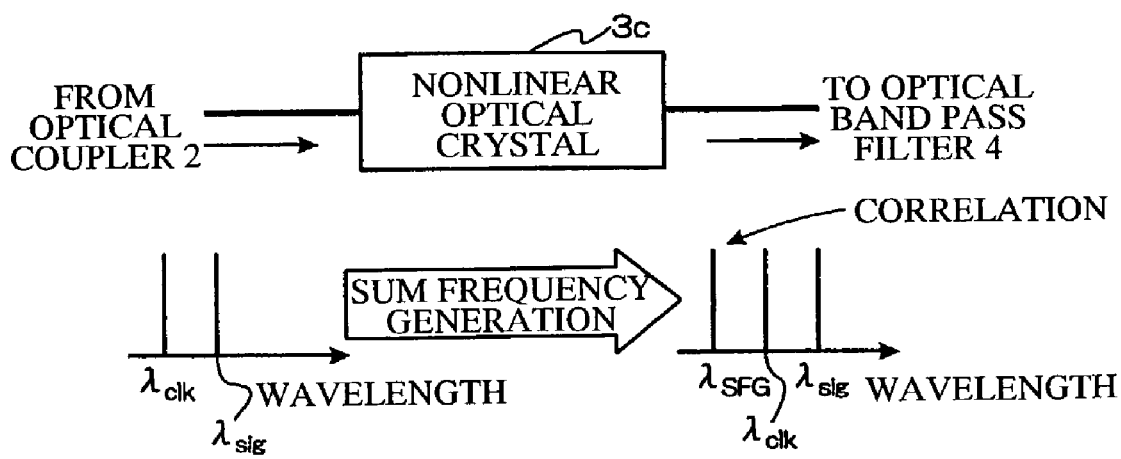
FIG. 4 is a drawing for explaining the constitution and action of nonlinear optical crystal 3c as another example of optical cross-correlation detection device 3 of FIG. 1.

FIG. 4 is a block diagram showing another example of optical cross-correlation detection device 3 in the optical clock phase-locked loop circuit shown in FIG. 1.

FIG. 4 shows a constitution that is used for the optical cross-correlation detection device 3 of FIG. 1 that uses the sum frequency generation in nonlinear optical crystal 3c. Sum frequency generation refers to a process in which, when two types of light having optical frequencies ν1 and ν2 have entered nonlinear optical crystal 3c, light is output having an optical frequency that is the sum of both (ν3=ν1 +ν2) at a magnitude that is proportional to the product of the intensities of the two types of incident light. The details of this process is described in Takara, Kawanishi, Yamabayashi and Endoh, "Ultra-High-Speed Optical Waveform Measurement Method by Optical Sampling Using Sum Frequency Generation", Collection of Papers of the Institute of Electronics, Information and Communication Engineers, B-1, vol. J75-B1, pp. 372–380, 1992. Since the generated sum frequency light has cross-correlating components of two types of the incident lights, a PLL can be realized by converting the sum frequency light to an electrical signal and feeding it back to VCO 7. Examples of nonlinear optical crystal 3c include $LiNbO_3$ (lithium niobate), KTP ($KTiOPO_4$; potassium titanylphosphate) and AANP (2-adamantylamino-5-nitropyridine).

Embodiment 5

Figure 5:
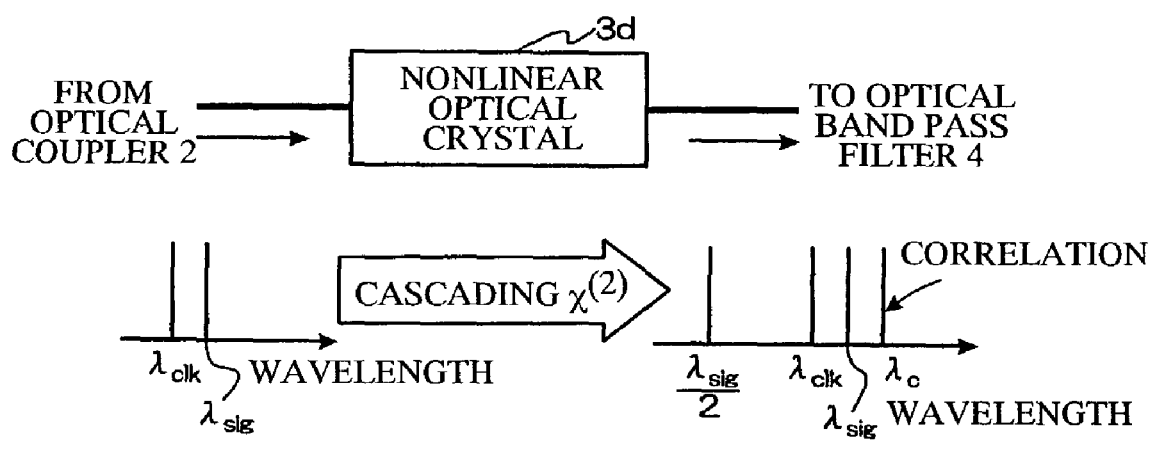
FIG. 5 is a drawing for explaining the constitution and action of nonlinear optical crystal 3d as another example of optical cross-correlation detection device 3 of FIG. 1.

FIG. 5 is a block diagram showing another example of optical cross-correlation detection device 3 of the optical clock phase-locked loop circuit shown in FIG. 1.

The present embodiment is the case of using cascaded $\chi^{(2)}$ processes in nonlinear optical crystal 3$d$ for the optical cross-correlation detection device 3 of FIG. 1. These cascaded $\chi^{(2)}$ processes refer to processes in which, when two types of light of wavelengths $\lambda_1$ and $\lambda_2$ have entered nonlinear optical crystal 3$d$, light of a new wavelength $\lambda_C$ is generated based on the relationship expressed with the equation $1/\lambda_C = 2/\lambda_1 - 1/\lambda_2$. Generation of light of wavelength $\lambda_C$ consists of two processes. To begin with, in the first process, light of wavelength $\lambda_1/2$ is generated by second harmonic generation (SHG) of wavelength $\lambda_1$ that has entered nonlinear optical crystal 3$d$. In the second process, light of wavelength $2/\lambda_1 - 1/\lambda_2$ ($=1/\lambda_C$) is generated by the generation of a differential wavelength of light of wavelength $\lambda_1/2$ generated by SHG and another light (wavelength $\lambda_2$) entering the crystal. Although light of wavelength $\lambda_C$ is generated in this manner, when focusing on the relationship between the wavelength of light that enters the crystal and the wavelength of light that leaves the crystal, it is the same as that of the four-wave mixing shown in FIG. 2B(ii) and so forth, thereby enabling this constitution to realize a PLL as well. Examples of nonlinear optical crystal 3$d$ include periodically-poled LiNbO$_3$ and MgO-LiNbO$_3$ (magnesium oxide-lithium niobate).

Embodiment 6

Figure 6:
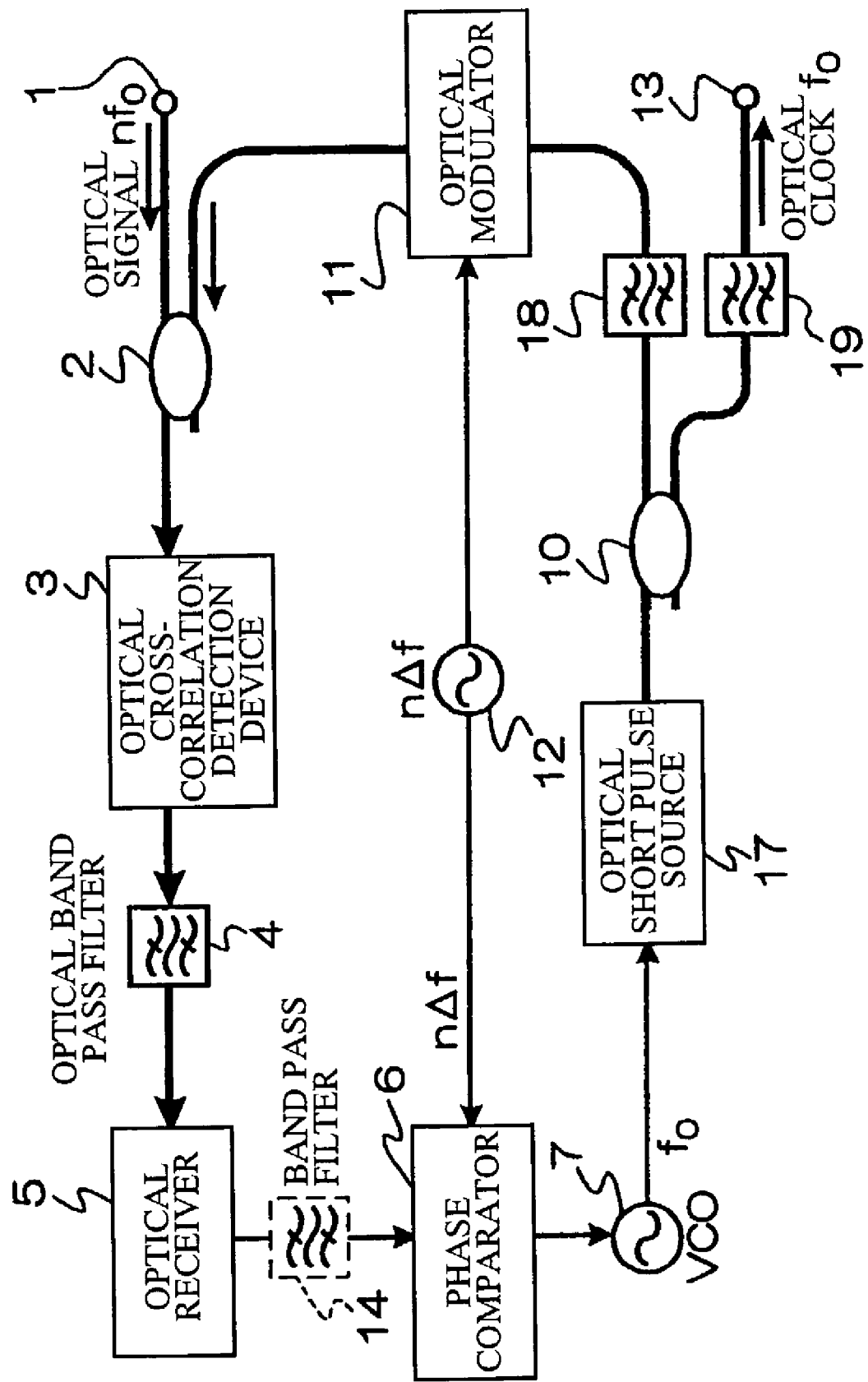
FIG. 6 is a block diagram showing another embodiment of an optical clock phase-locked loop circuit according to the present invention.

FIG. 6 is a block diagram showing another embodiment of an optical clock phase-locked loop circuit according to the present invention. In FIG. 6, the same reference symbols are used to indicate the same constituent features as those shown in FIG. 1.

The optical clock phase-locked loop circuit shown in FIG. 6 uses an optical short pulse source 17 that generates optical pulses containing a broad-brand frequency component at pulse repetition frequency $f_0$ instead of optical pulse generator 8 in the optical clock phase-locked loop circuit shown in FIG. 1. The optical output of this optical short pulse source 17 is input directly to optical coupler 10 without going through optical amplifier 9. However, if necessary, the optical output of this optical short pulse source 17 may be input to optical coupler 10 through the optical amplifier 9. Output light from the two output terminals of optical coupler 10 are input to optical modulator 11 via optical band pass filters 18 and 19, respectively, and output from optical clock output terminal 13.

In the, constitution, after the output of optical short pulse source 17 driven by the output of VCO 7 is divided with optical coupler 10, one of the outputs is input to optical modulator 11 after cutting out an optical pulse having a desired frequency ($\lambda_{clk1}$) present in the spectrum of the broad-band pulse light with optical band pass filter 18. The other port of the output of optical coupler 10 is output from optical clock output terminal 13 after also cutting out an optical pulse having a desired frequency ($\lambda_{clk2}$) present in the spectrum of the broad-band pulse light with variable wavelength optical band pass filter 19.

The present embodiment has the advantage of being able to independently set the wavelength of optical clock used for optical cross-correlation detection device 3 and optical clock output to the outside. For example, although it is necessary to set wavelength $\lambda_{clk1}$ of optical clock input to optical cross-correlation detection device 3 to be different from optical signal wavelength $\lambda_{sig}$, wavelength $\lambda_{clk2}$ of externally output optical clock can be set to the same wavelength as optical signal wavelength $\lambda_{sig}$. Examples of optical short pulse source 17 include a mode-locked laser and supercontinuum source.

Embodiment 7

Figure 7:
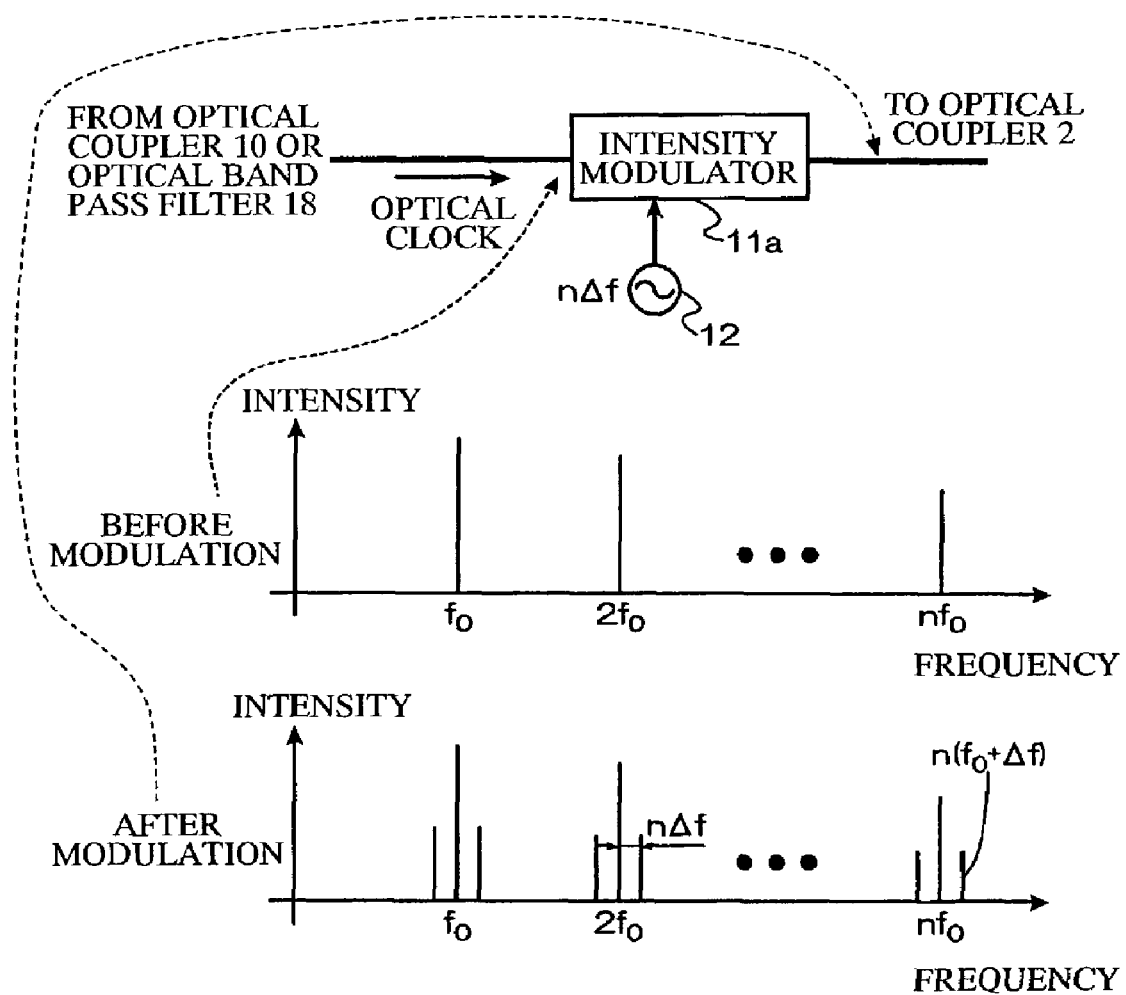
FIG. 7 is a drawing for explaining the constitution and action of intensity modulator 11a as an example of optical modulator 11 of FIGS. 1 and 6.

FIG. 7 is a block diagram showing an example of optical modulator 11 in the optical clock phase-locked loop circuit shown in FIG. 1 or FIG. 6.

In the present embodiment, an optical intensity modulator 11$a$ is used for optical modulator 11. When optical clock having a narrow pulse width at repetition frequency $f_0$ is intensity-modulated with sine wave n$\Delta$f, a sideband occurs at frequencies of $f_0$ and $\pm n\Delta f$ of its harmonic components (refer to the frequency distribution after modulation of FIG. 7). Component n($f_0 + \Delta f$) of these frequency components is used for detection of cross-correlation. Examples of optical intensity modulator 11$a$ include a Mach-Zehnder LiNbO$_3$ optical intensity modulator and electroabsorption optical modulator.

Embodiment 8

Figure 8:
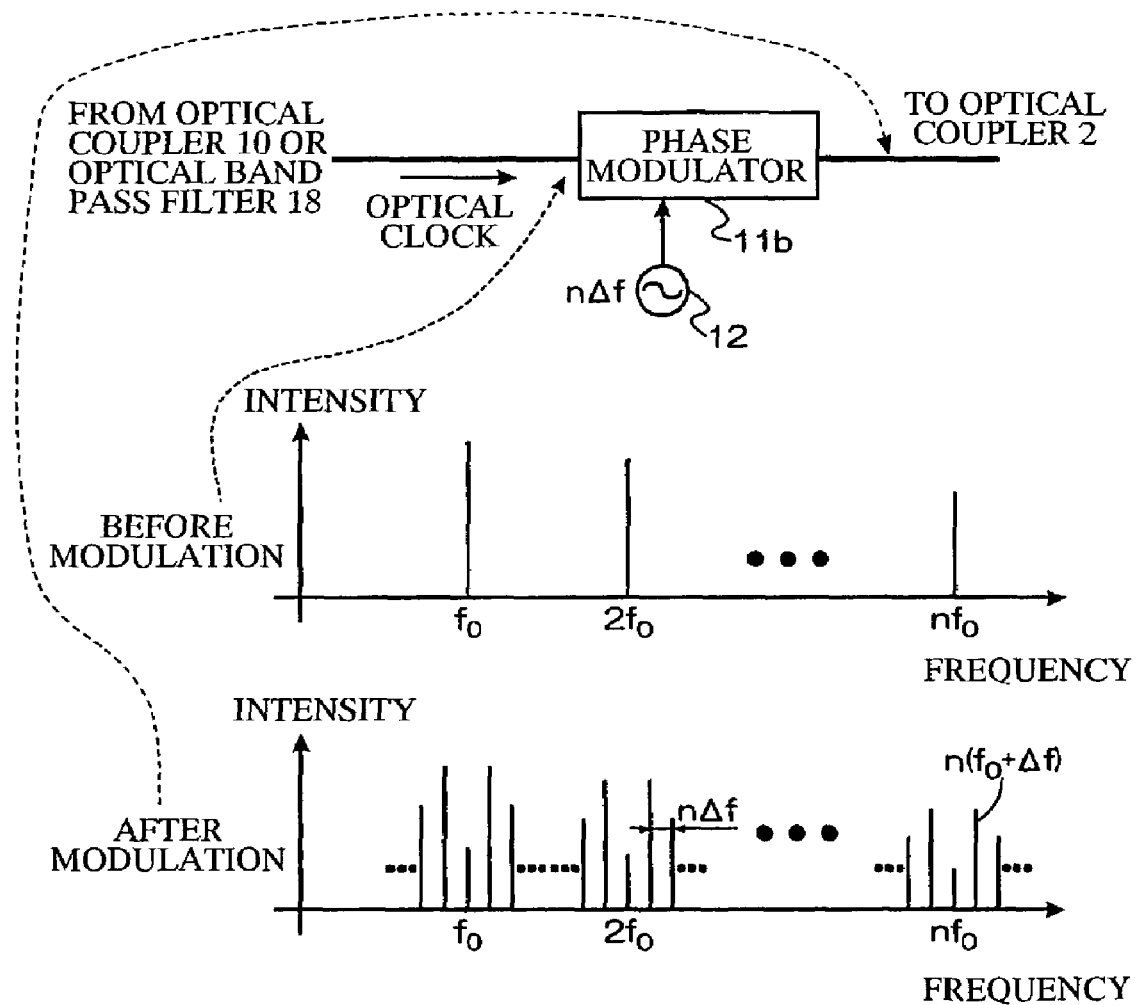
FIG. 8 is a drawing for explaining the constitution and action of phase modulator 11b as another example of optical modulator 11 of FIGS. 1 and 6.

FIG. 8 is a block diagram showing another example of optical modulator 11 in the optical clock phase-locked loop circuit shown in FIG. 1 or FIG. 6.

The present embodiment uses an optical phase modulator for optical modulator 11. When optical clock having a narrow pulse width at repetition frequency $f_0$ is intensity-modulated with sine wave n$\Delta$f, a large number of sidebands occur at frequencies of $f_0$ and $\pm mn\Delta f$ (where m is a natural number) of its harmonic components (refer to the frequency distribution after modulation of FIG. 8). The component n($f_0 + \Delta f$) of these frequency components is used for optical cross-correlation detection. Although the n($f_0 + \Delta f$) component is always smaller than the n$f_0$ component in the case of intensity modulation, in the case of phase modulation, the n($f_0 + \Delta f$) component can be larger than the n$f_0$ component depending on the modulation coefficient. Details are described in, for example, Y. Taki, "Communication Systems" (Corona Corp.), Chapter 7. Since the n$f_0$ component is present as noise during phase comparison, the present embodiment is able to realize higher performance than a constitution using an optical intensity modulator. Examples of an optical phase modulator include a traveling-wave LiNbO$_3$ optical phase modulator.

Embodiment 9

Figure 9:
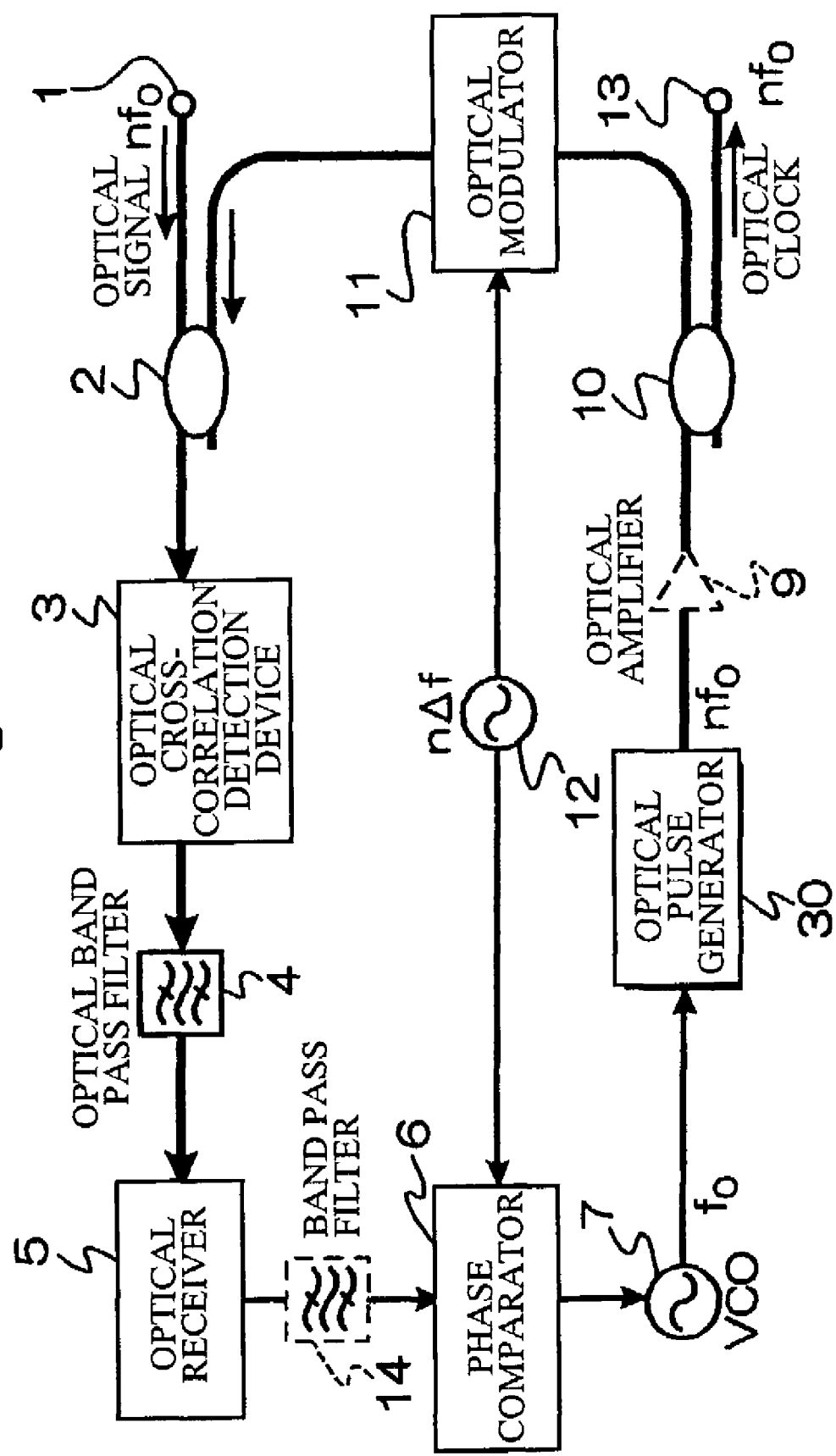
FIG. 9 is a block diagram showing another embodiment of an optical clock phase-locked loop circuit according to the present invention.

FIG. 9 is a block diagram showing another embodiment of an optical clock phase-locked loop circuit according to the present invention. In FIG. 9, the same reference symbols are used to indicate the same constituent features as shown in FIG. 1.

In Embodiment 1 shown in FIG. 1, the repetition frequency of a optical clock pulse train output from optical clock output terminal 13 was $f_0$, and bit rate n$f_0$ of the optical signal corresponded to the result of dividing by 1/n. On the other hand, in Example 9 shown in FIG. 9, the repetition frequency of the optical clock pulse train output from optical clock output terminal 13 is the same as bit rate n$f_0$ of the optical signal.

In the present embodiment, instead of pulse generator 8 of FIG. 1, a pulse generator 30 is used that has a different repetition frequency of optical pulse generation from that of pulse generator 8. Pulse generator 8 of FIG. 1 was driven at oscillation frequency $f_0$ of the output signal of VCO 7, and generated an optical pulse train at a repetition frequency of frequency $f_0$ equal to it. On the other hand, pulse generator 30 of FIG. 9 is driven by the output signal at oscillation frequency $f_0$ from VCO 7, and generates an optical pulse train at a repetition frequency of n$f_0$ that is n times that frequency. In this case, since optical cross-correlation detection does not require a harmonic component of the optical clock, the pulse width does not have to be a narrow pulse like that which contains a harmonic of the optical clock. Examples of optical pulse generator 30 include a harmonic mode-locked laser and a constitution in which a pulse train multiplexing device is combined with an ordinary optical pulse generator similar to optical pulse generator 8 shown in FIG. 1.

Figure 10A:
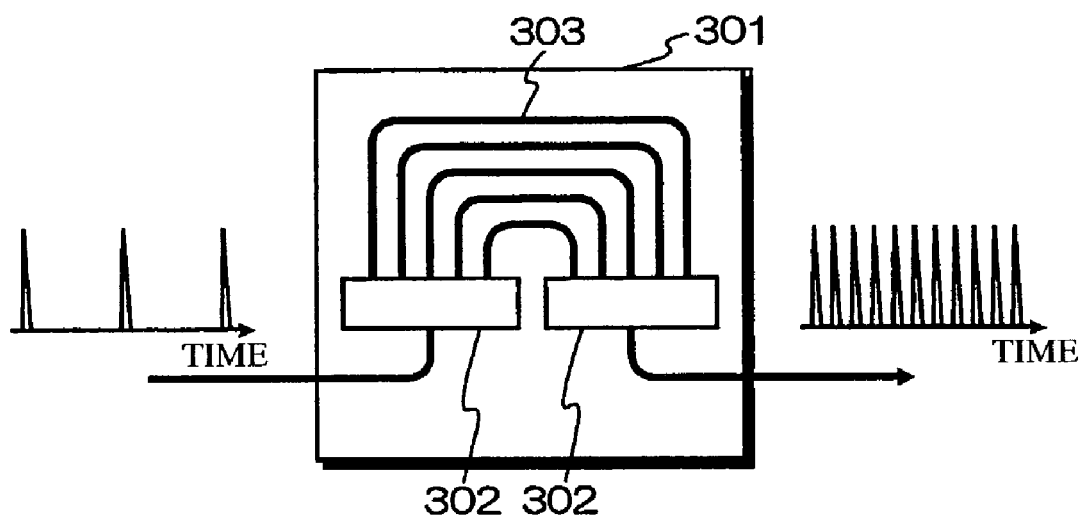
FIGS. 10A and 10B are block diagrams showing an example of a pulse train multiplexing device in the case of composing optical clock generator 30 of FIG. 9 by combining a pulse train multiplexing device with an optical pulse generator, with FIG. 10A showing the constitution of 5-times multiplexing, and FIG. 10B showing the constitution of 4-times multiplexing.
Figure 10B:
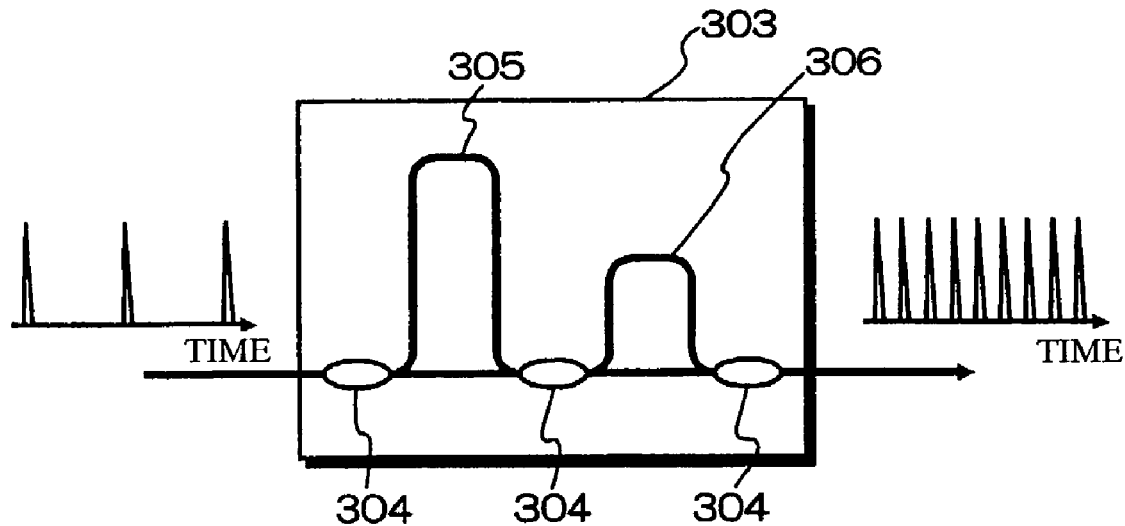

FIGS. 10A and 10B are block diagrams showing examples of pulse train multiplexing device used in the case of composing optical pulse generator of FIG. 9 by combining a pulse train multiplexing device with an ordinary optical pulse generator. In FIGS. 10A and 10B, the pulse multiplexing device is composed by an optical pulse multiplexing circuit using a planar lightwave circuit (PLC) (Reference: H. Takara et al., "100 Gbit/s optical signal eye-diagram measurement with optical sampling using organic nonlinear optical crystal," Electron. Lett., vol. 32, no. 24, pp. 2256–2258, 1996; S. Kawanishi et al., "100 Gbit/s, 50 km and nonrepeated optical transmission employing all-optical multi/demultiplexing and PLL timing extraction", Electron. Lett., vol. 29, no. 12, pp. 1075–1077, 1993). In the constitution of FIG. 10A, the repetition frequency of the input light pulse train is increased five-fold, while in FIG. 10B, the repetition frequency of the input light pulse train is incremented four-fold.

The optical pulse train multiplexing device of FIG. 10A is a constitution that forms two 1×n couplers 302 on quartz substrate 301, and n number of optical waveguides 303 having different delay times coupled between them. An optical pulse train of repetition frequency $f_0$ is multiplexed n times by being coupled by imparting a delay time (T/n: T is the period of the optical pulse train) that differs for each channel after being divided among n channels, resulting in the generation of an optical pulse train having a repetition frequency of $f_0 \times n$ (n=5 in FIG. 5 indicating five-times multiplexing).

The optical pulse train multiplexing device of FIG. 10B is composed by connecting a Mach-Zehnder interferometer connected longitudinally in n stages, the interferometer being composed by 2×2 couplers 304 and optical waveguides 305 and 306 on quartz substrate 303. In this constitution, $2^n$ types of light paths having different delay times are formed from the input end to the output end. An optical pulse train of repetition frequency $f_0$ is separated into $2_n$, and by then coupling while propagating at respectively different delay times, an optical pulse train of repetition frequency $f_0 \times 2_n$ is generated (n=2 in FIG. 10B indicating four-times multiplexing).

The optical pulse train multiplexing device is not limited to the constitutions of FIGS. 10A and 10B, but rather, that described in, for example, Japanese Patent Unexamined Application, First Publication No. 11-38259 entitled, "High-Speed Optical Pulse Generation Device" can also be used. This uses a dispersion imparting device for the optical pulse train multiplexing device. This device is based on the principle in which, when focusing on the spectral components at a certain time of an optical pulse train of repetition frequency $f_0$ to which dispersion is imparted by the dispersion imparting device, two or more different optical frequency components are contained in optical pulses according to the magnitude of the dispersion. If the difference in optical frequency of these different optical frequency components is n times $f_0$, then an optical pulse train of repetition frequency $f_0 \times n$ is obtained at the output of the dispersion imparting device.

Embodiment 10

Figure 11:
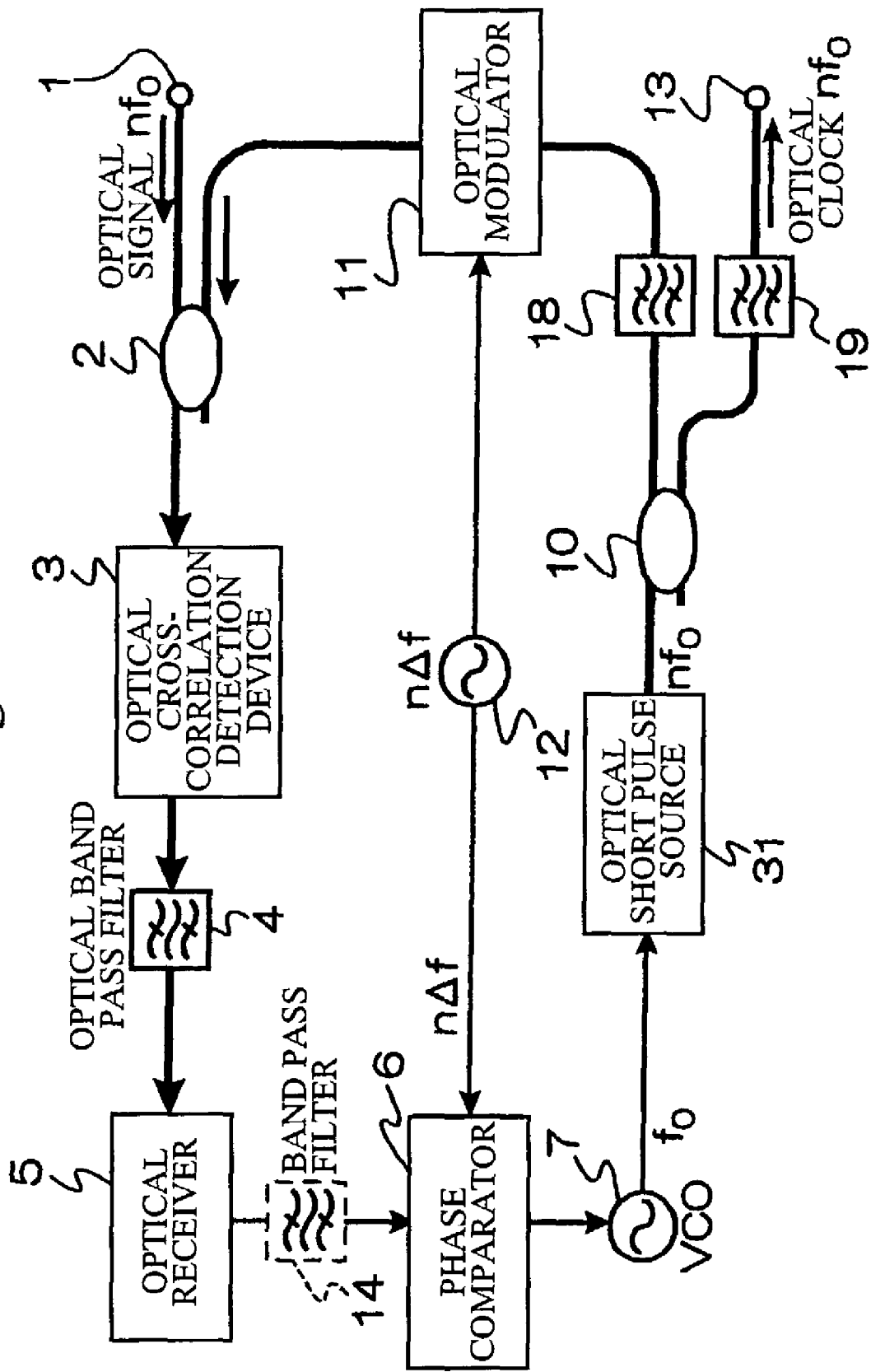
FIG. 11 is a block diagram showing another embodiment of an optical clock phase-locked loop circuit according to the present invention.

FIG. 11 is a block diagram showing another embodiment of an optical clock phase-locked loop circuit according to the present invention. In FIG. 11, the same reference symbols are used to indicate the same constituent features shown in FIG. 6.

In Embodiment 6 shown in FIG. 6, the repetition frequency of a optical clock pulse train output from optical clock output terminal 13 was $f_0$, and optical signal bit rate $nf_0$ was divided by 1/n. On the other hand, in Embodiment 10 shown in FIG. 11, the repetition frequency of the optical clock pulse train output from optical clock output terminal 13 is the same as frequency $nf_0$ of the optical signal bit rate.

In the present embodiment, instead of optical short pulse source 17 of FIG. 6, optical short pulse source 31 is used which has a different repetition frequency of optical pulse generation from that of optical short pulse source 17. Optical short pulse source 17 of FIG. 6 was driven at oscillation frequency $f_0$ of the output signal of VCO 7, and generated a broad-band optical pulse train at a repetition frequency of frequency $f_0$ that was equal to it. On the other hand, broad-band optical light source 31 of FIG. 11 is driven with an output signal of oscillation frequency $f_0$ from VCO 7, and generates an optical pulse train at a repetition frequency of $nf_0$ that is n times that frequency.

According to the constitution of Embodiment 10, in addition to the characteristics of Embodiment 9, there is also the advantage of being able to independently set the wavelengths of the optical clock used for optical cross-correlation detection (input of optical modulator 11) and the optical clock output to the outside (output of optical clock output terminal 13) by changing the setting of the pass frequency of optical band pass filter 19. Examples of an optical short pulse source that is driven at frequency $f_0$ and outputs a broad-band optical pulse train of repetition frequency $nf_0$ include a harmonic mode-locked laser and a supercontinuum laser in which the optical pulse generator described in Embodiment 9 is used as a pumping light source.

Figure 12:
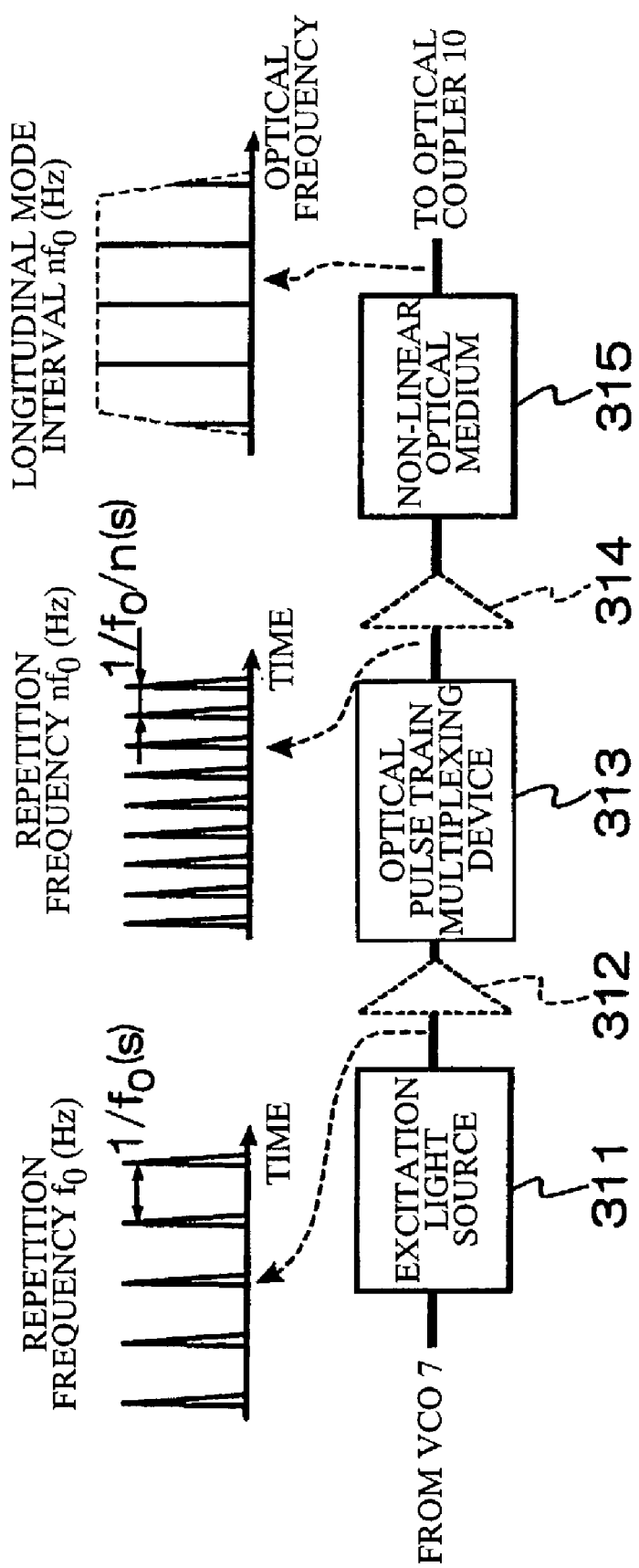
FIG. 12 is a drawing for explaining an example of an optical short pulse source 31 of FIG. 11.
Figure 13:
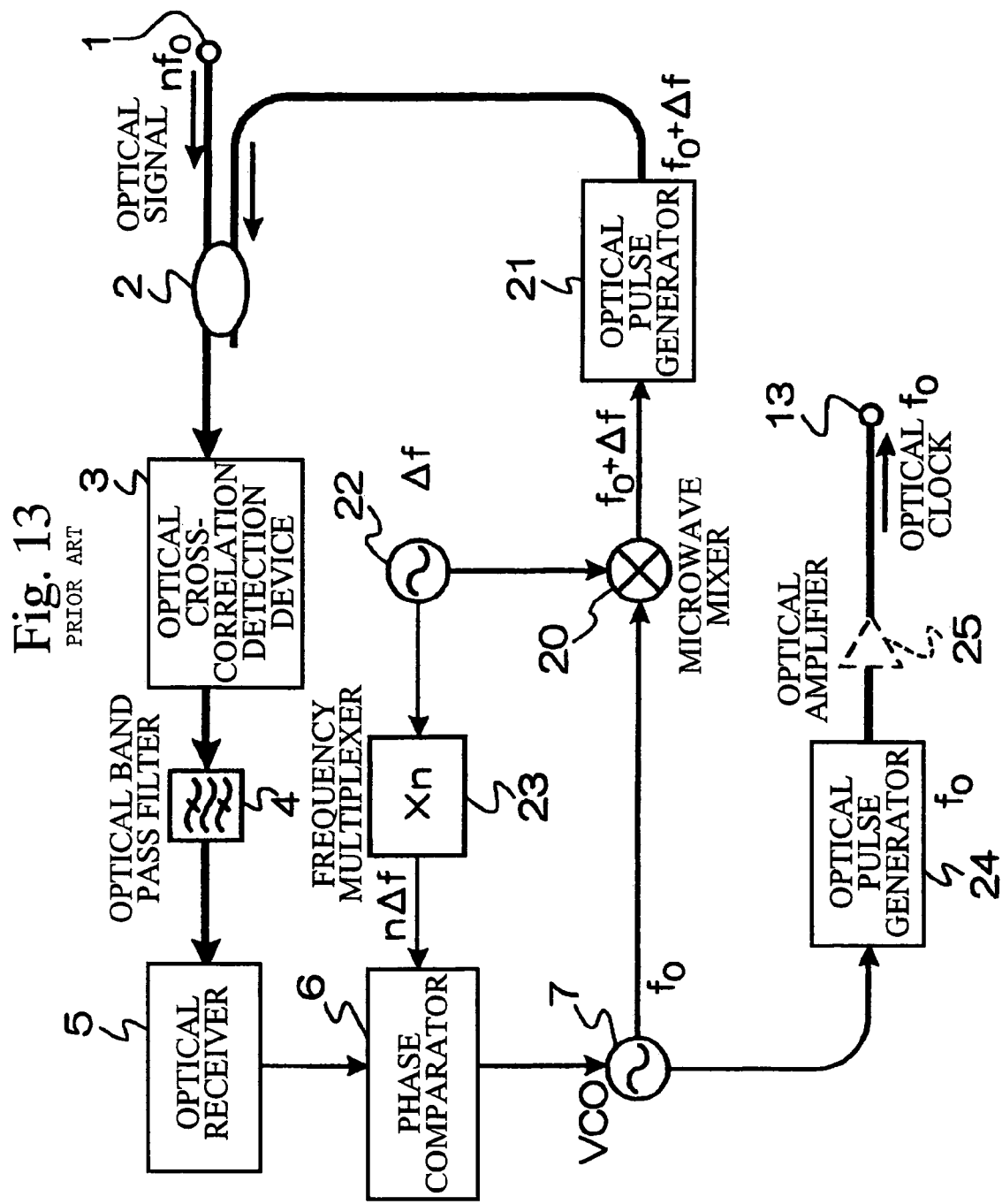
FIG. 13 is a block diagram showing an example of an optical clock phase-locked loop circuit of the prior art.

FIG. 12 is a drawing for explaining the example of optical short pulse source 31 of Embodiment 10 shown in FIG. 11. The optical short pulse source shown in FIG. 12 is composed of pumping light source 311 driven by the output pulse of VCO 7, optical amplifier 312, optical pulse train multiplexing device 313, optical amplifier 314 and nonlinear optical medium 315. In this case, optical pulse train multiplexing device 313 can be composed in the manner shown in FIGS. 10A and 10B, for example, and optical amplifiers 312 and 314 can be omitted.

The optical pulse train of repetition frequency $f_0$ (Hz) output from pumping light source 311 is input to optical pulse train multiplexing device 313 and multiplexed n times after which it becomes an optical pulse train of repetition frequency $f_0 \times n$ (Hz). As a result, in nonlinear optical medium 315 to which this optical pulse train is input can be made to generate coherent white light (multi-wavelength light) in which the longitudinal mode interval (channel frequency interval) has been expanded to $f_0 \times N$ (Hz).

As has been explained above, according to the embodiments of the present invention, in an optical clock phase-locked loop circuit that performs clock extraction using a PLL, optical pulse generator 8, optical short pulse source 17, optical pulse generator 30 or optical short pulse source 31, which generate clock pulse light of reference frequency $f_0$ of optical signal for which the bit rate is $nf_0$ or clock pulse light of frequency $nf_0$ that is the same frequency as the bit rate of the optical signal, is not installed outside the PLL loop, but rather is installed within the PLL loop, thereby making it possible to absorb jitter within the PLL.

Embodiments of the present invention are not limited to those described above, but rather can be suitably modified by the addition or omission of, for example, optical band pass filters, band pass filters for electrical signals, optical amplifiers and so forth.

The invention claimed is:

1. An optical clock phase-locked loop circuit comprising:
   a first oscillator that outputs an alternating current signal,
   a first optical coupler that couples an input optical signal and a modulated optical clock signal,
   an optical cross-correlation detection device that incorporates said optical signal and said modulated optical clock signal coupled by the first optical coupler, and outputs light that contains the cross-correlation components between both signals,
   an optical band pass filter that extracts light of a wavelength that contains cross-correlating components from the output from the optical cross-correlation detection device,
   an optical receiver that converts the light extracted with the optical band pass filter containing cross-correlating components to an electric cross-correlation signal,
   a phase comparator that outputs a comparison of the phases of the output signal of the first oscillator and the cross-correlation signal output from the optical receiver,
   a second oscillator that changes its oscillation frequency and phase corresponding to the output of the phase comparator,
   an optical pulse generator driven by the second oscillator that generates an optical clock output having a narrow enough pulse width for containing an nth harmonic component (where n is an integer of 2 or more),
   a second optical coupler that divides into two portions the optical clock output from the optical pulse generator,
   an optical modulator driven by the first oscillator that modulates one portion of the optical clock divided by the second optical coupler, and outputs that portion in the form of the modulated optical clock to the first optical coupler, and
   an output device that outputs the other portion of the optical clock divided by the second optical coupler.

2. The optical clock phase-locked loop circuit according to claim 1, wherein the optical cross-correlation detection device is a traveling-wave semiconductor optical amplifier.

3. The optical clock phase-locked loop circuit according to claim 1, wherein the optical cross-correlation detection device comprises an optic fiber.

4. The optical clock phase-locked loop circuit according to claim 1, wherein the optical cross-correlation detection device is a nonlinear optical crystal.

5. The optical clock phase-locked loop circuit according to claim 1, wherein an optical short pulse source that generates optical pulses containing broad-band frequency components is used as the optical pulse generator, and an optical band pass filter is provided in each output of the second optical coupler.

6. The optical clock phase-locked loop circuit according to claim 1, wherein the optical modulator is an optical intensity modulator.

7. The optical clock phase-locked loop circuit according to claim 1, wherein the optical modulator is an optical phase modulator.

8. The optical clock phase-locked loop circuit according to claim 4, wherein the optical cross-correlation detection device is a constitution that uses sum frequency generation in a nonlinear optical crystal.

9. The optical clock phase-locked loop circuit according to claim 4, wherein the optical cross-correlation detection device is a constitution that uses cascaded $\chi^{(2)}$ processes in a nonlinear optical crystal.

10. The optical clock phase-locked loop circuit according to claim 5, wherein the optical short pulse source is a mode-locked laser or supercontinuum light source.

11. An optical clock phase-locked loop circuit comprising:
    a first oscillator that outputs an alternating current signal,
    a first optical coupler that couples an input optical signal and a modulated optical clock signal,
    an optical cross-correlation detection device that incorporates said optical signal and said modulated optical clock signal coupled by the first optical coupler and outputs light that contains the cross-correlation components between both signals,
    an optical band pass filter that extracts light of a wavelength that contains cross-correlating components from the output from the optical cross-correlation detection device,
    an optical receiver that converts the light extracted with the optical band pass filter containing cross-correlating components to an electric cross-correlation signal,
    a phase comparator that outputs a comparison of the phases of the output signal of the first oscillator and the cross-correlation signal output from the optical receiver,
    a second oscillator that changes its oscillation frequency and phase corresponding to the output of the phase comparator,
    an optical pulse generator driven by the second oscillator that generates an optical pulse train at a repetition frequency n times (where n is an integer of 2 or more) the oscillation frequency of said second oscillator,
    a second optical coupler that divides into two portions the optical clock output from the optical pulse generator,
    an optical modulator driven by the first oscillator that modulates one portion of the optical clock divided by the second optical coupler, and outputs that portion in the form of the modulated optical clock to the first optical coupler, and
    an output device that outputs the other portion of the optical clock divided by the second optical coupler.

12. The optical clock phase-locked loop circuit according to claim 11, wherein an optical short pulse source that generates a pulse train containing broad-band frequency components at a repetition frequency n times (where n is an integer of 2 or more) the oscillation frequency of the second oscillator, is used as the optical pulse generator, and an optical band pass filter is provided in each output of the second optical coupler.

* * * * *